(12) United States Patent
Afrasiabi et al.

(10) Patent No.: US 11,216,928 B2
(45) Date of Patent: Jan. 4, 2022

(54) METHOD AND APPARATUS FOR COATING THICKNESS INSPECTION OF A SURFACE AND COATING DEFECTS OF THE SURFACE

(71) Applicant: The Boeing Company, Chicago, IL (US)

(72) Inventors: Amir Afrasiabi, Tukwila, WA (US); Gabriel Burnett, Newcastle, WA (US); Chandler Chockalingam, Seattle, WA (US); William David Kelsey, Issaquah, WA (US); Jacob Pete McHenry, Seattle, WA (US); Rosemary Pham, Everett, WA (US)

(73) Assignee: The Boeing Company, Chicago, IL (US)

( * ) Notice: Subject to any disclaimer, the term of this patent is extended or adjusted under 35 U.S.C. 154(b) by 113 days.

(21) Appl. No.: 16/566,286

(22) Filed: Sep. 10, 2019

(65) Prior Publication Data

US 2021/0073970 A1    Mar. 11, 2021

(51) Int. Cl.
*G06T 7/00* (2017.01)
*G06T 7/90* (2017.01)

(52) U.S. Cl.
CPC .............. *G06T 7/0002* (2013.01); *G06T 7/90* (2017.01)

(58) Field of Classification Search
None
See application file for complete search history.

(56) References Cited

U.S. PATENT DOCUMENTS

| | | | |
|---|---|---|---|
| 10,424,056 B2 | 9/2019 | Hunt | |
| 2010/0177326 A1* | 7/2010 | Sakai | G01B 11/06 356/632 |
| 2015/0262383 A1 | 9/2015 | Yajko | |
| 2015/0324970 A1* | 11/2015 | Iwanaga | G06T 7/60 382/145 |
| 2017/0132799 A1* | 5/2017 | Yajko | G06K 9/4652 |
| 2019/0011252 A1* | 1/2019 | Moeller | B05C 21/00 |

FOREIGN PATENT DOCUMENTS

| | | |
|---|---|---|
| JP | H08304035 A | 11/1996 |
| JP | 20100276349 A | 12/2010 |
| WO | 2019099415 A1 | 5/2019 |

OTHER PUBLICATIONS

European Search Report for European Application No. 20193226.6 dated Feb. 3, 2021, 7 pages.

* cited by examiner

*Primary Examiner* — Justin P. Misleh

(74) *Attorney, Agent, or Firm* — Sage Patent Group

(57) ABSTRACT

A method and apparatus is provided to inspect coverage of a coating applied to a surface of a component. A coating color space value of a color of the coating is obtained based on a camera, a light source, and the surface, each value having an associated coating thickness applied to the surface. Images of the coating covered surface are obtained. Each image is processed by determining color space values of the image, determining whether the associated coating thickness of the color space values is within a specified tolerance of a required thickness of coating based on a comparison of the color space values to color space values associated with the required thickness of coating, and responsive to the associated thickness of coating of the color space values being outside of the specified tolerance, providing an indication that the surface shown in the image is outside of the specified tolerance.

20 Claims, 10 Drawing Sheets

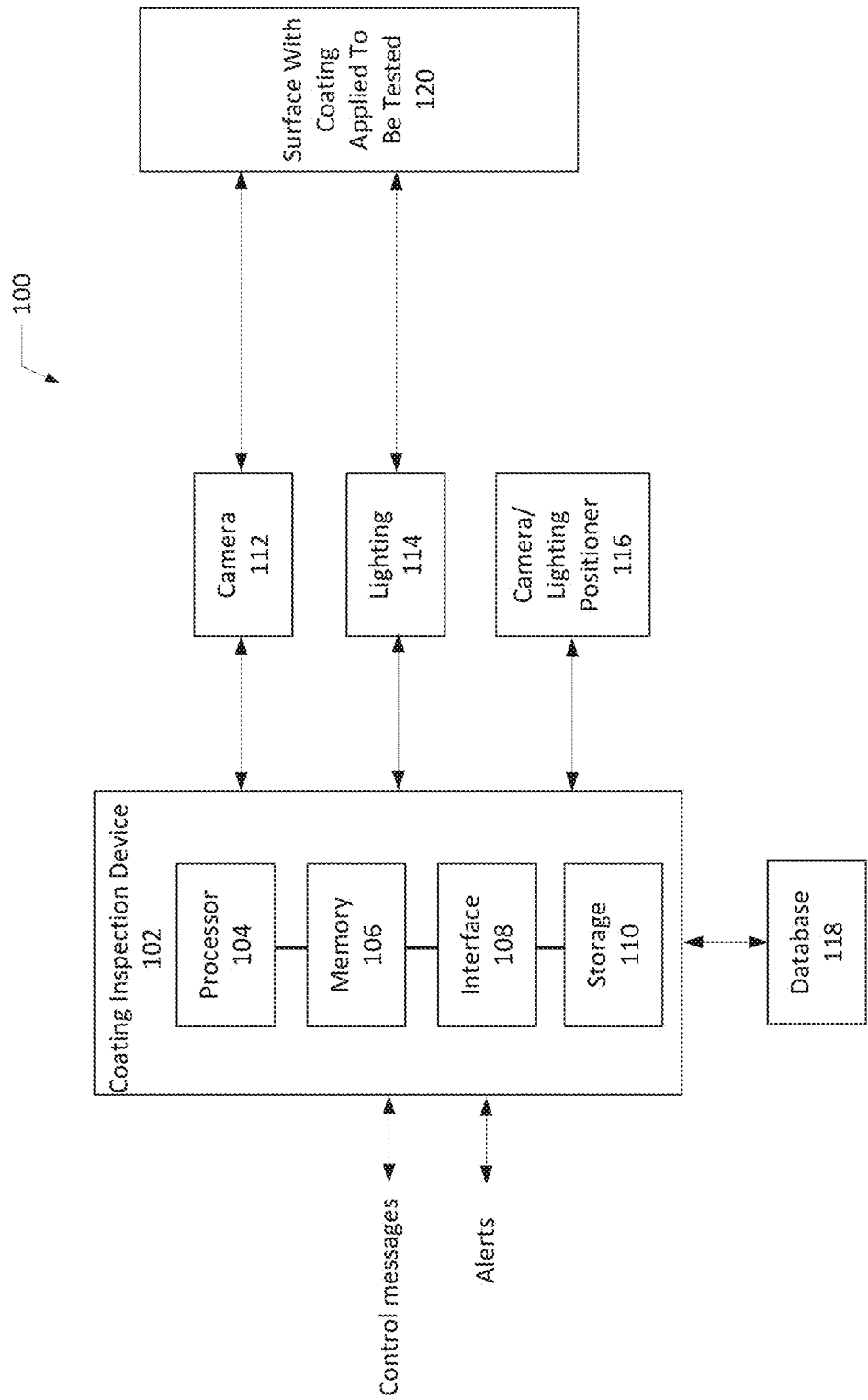

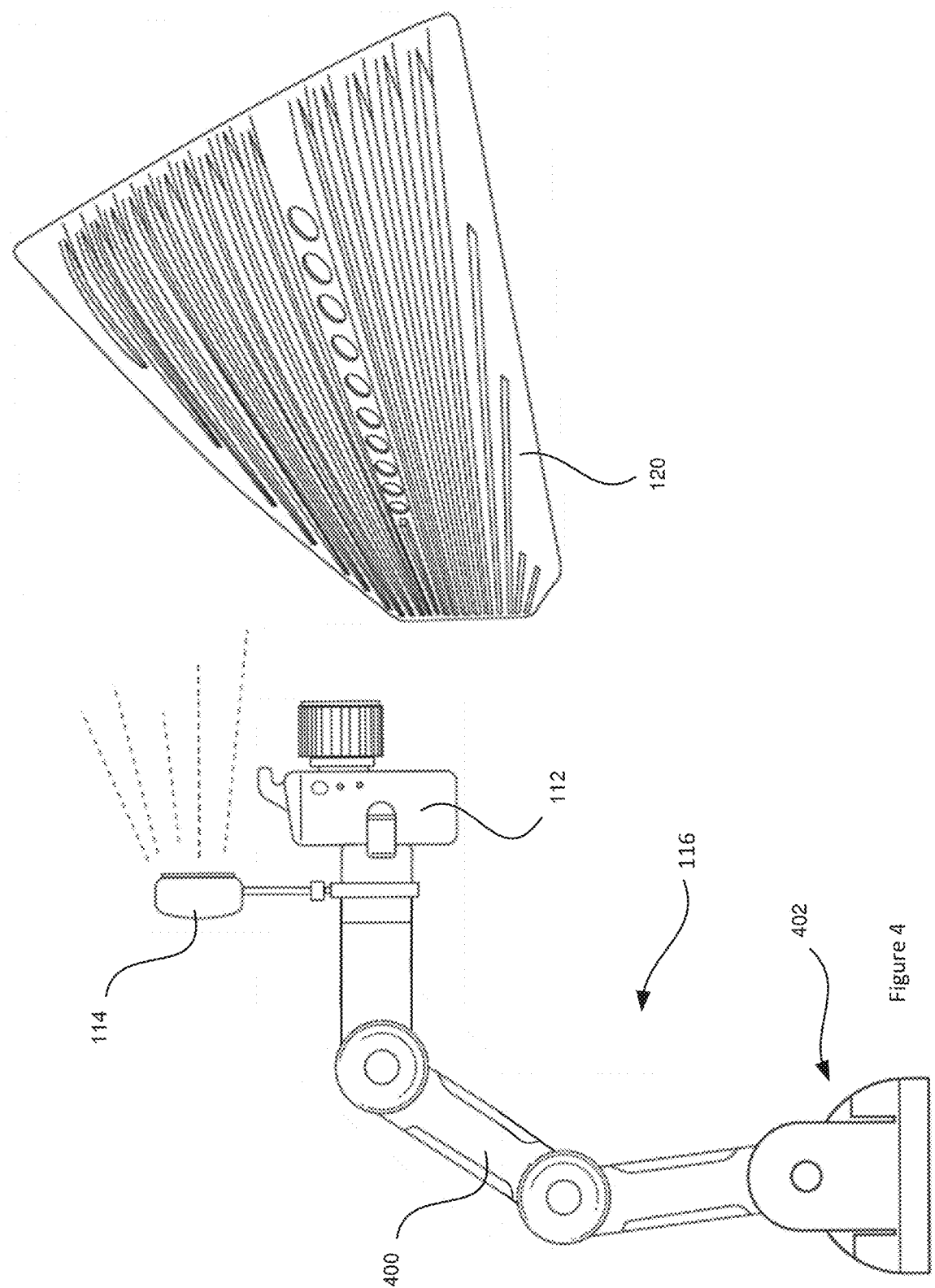

METHOD AND APPARATUS FOR COATING THICKNESS INSPECTION OF A SURFACE AND COATING DEFECTS OF THE SURFACE

The present disclosure relates generally to coverage coating inspection of surfaces, and more particularly to computer implemented coating inspection.

BACKGROUND

Coverage coating inspection of coating on surfaces such as surfaces on automobiles, aircraft, etc. traditionally rely on visual inspections to check for differences in coverage thickness based on differences in color of the coating.

Devices utilizing electronic magnetic gauges have been used for metal surfaces where a constant pressure probe is used to prove consistent readings between operators of the device. On other conductive metals such as aluminum, devices using eddy current techniques have been used. These devices operate by placing a probe near the conductive metal surface where a coil within the probe generates an alternating magnetic field that sets up eddy currents on the metal's surface. These eddy currents create their own opposing electromagnetic field that can be sensed by a second, adjacent coil. None of these devices work on composite surfaces.

For other surfaces, inspection must be done using a magnifying glass to detect changes in the thickness of the coating and to detect defects such as small pinholes in the coating. This requires human inspection, which may not be consistent between inspectors performing the inspection as the inspection relies on the accuracy of human vision and repeatability of the inspector inspecting multiple surfaces. The inconsistency between inspectors may result in some surfaces passing inspection that should have failed inspection for failures such as lack of coverage of the coating, incorrect coatings applied, etc.

SUMMARY

A method performed by a processor to inspect coverage of a coating applied to a surface of a component is provided. The method includes obtaining coating color space values of a color of the coating based on a camera, a light source, and the surface, each coating color space value having an associated thickness of coating applied to the surface of the component. The method further includes obtaining images of the surface covered by the coating using the camera and the light source. The method further includes processing each image obtained by: determining one or more color space values of the image; determining whether the associated thickness of coating of the one or more color space values of the image are within a specified tolerance of a required thickness of coating based on a comparison of the one or more color space values of the image to one or more color space values associated with the required thickness of coating; and responsive to the associated thickness of coating of the one or more color space values of the image being outside of the specified tolerance, providing an indication that the surface shown in the image is outside of the specified tolerance.

In accordance with another embodiment, a method performed by a processor to inspect coverage of a coating applied to a surface of a component is provided. The method includes obtaining coating color space values of a color of the coating based on a camera, a light source, and the surface, each coating color space value having an associated thickness of coating. The method further includes obtaining images of the surface covered by the coating using the camera and the light source. The method further includes for each image obtained: determining one or more color space values of the image; determining whether the associated thickness of coating of the one or more color space values of the image is within a specified tolerance of a required thickness of coating based on a comparison of the color space value of the image to a color space value associated with the required thickness of coating; determining whether the coating of the surface shown in the image is free of specified defects based on comparing the image to images of the specified defects; responsive to the associated thickness of coating of the color space value of the image being outside of the specified tolerance, providing an indication that the surface shown in the image is outside of the specified tolerance; and responsive to determining the coating of the surface shown in the image has a defect, providing an indication that the coating has a defect, the indication comprising at least an identification of the defect and a location of the defect.

In accordance with another embodiment, a coating inspection device configured to inspect coverage of a coating applied to a surface of a component is provided. The coating inspection device has processing circuitry and memory coupled with the processing circuitry, wherein the memory includes instructions that when executed by the processing circuitry causes the coating inspection device to perform operations comprising controlling a camera/lighting positioner having a camera and a light source to position the camera and light source at a designated position relative to the surface to obtain images of the surface covered by the coating using the camera and the light source. The operations further include obtaining and storing the images of the surface covered by the coating using the camera and the light source. The operations further include processing the images obtained to determine if the coating applied to the surface is free of defects and has a thickness within a specified tolerance of a specified thickness.

One advantage that may be provided by the inventive concepts is the repeatability of inspection between components and over time that can avoid the inconsistencies that may arise between manual human inspections.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a block diagram illustrating an operating environment according to some embodiments;

FIG. 4 is a block diagram illustrating a camera and light source positioned by a camera/lighting positioner according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 2A:
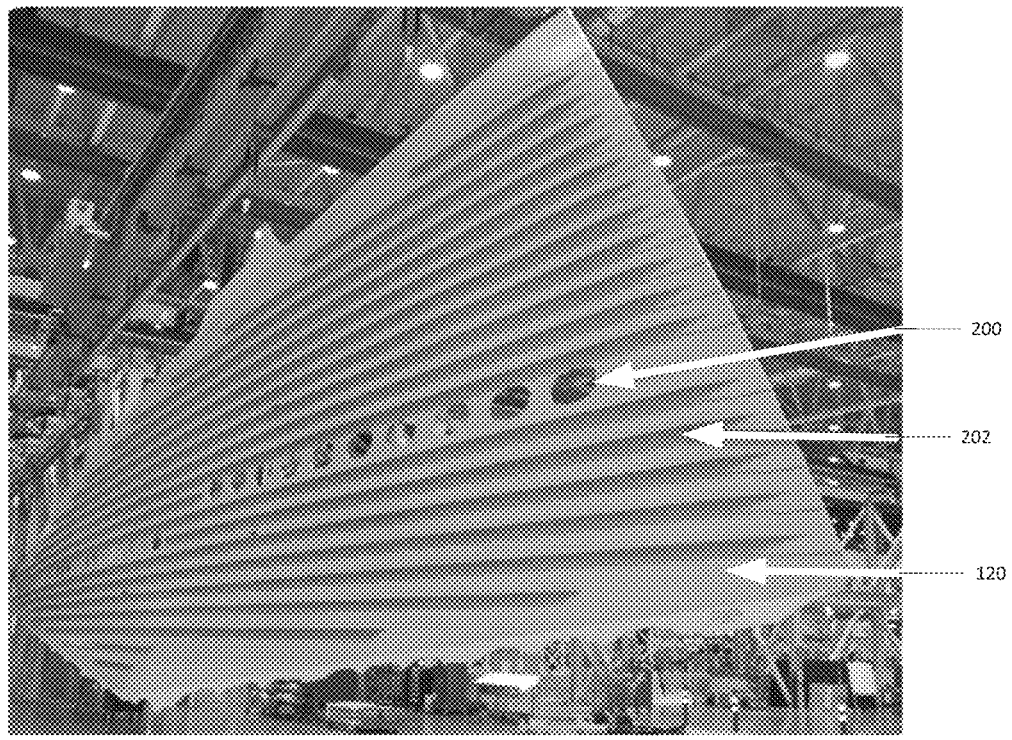
FIGS. 2A and 2B are examples of components that can be examined for covering thickness inspections and defect inspections according to some embodiments of inventive concepts.
Figure 2B:
Figure 3A:
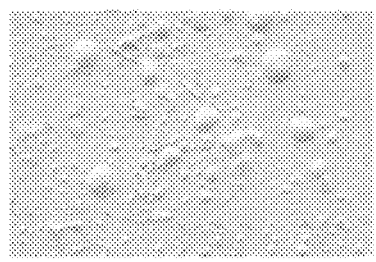
FIGS. 3A-3F are illustrations of defects that can be found in coatings applied to surfaces.
Figure 3B:
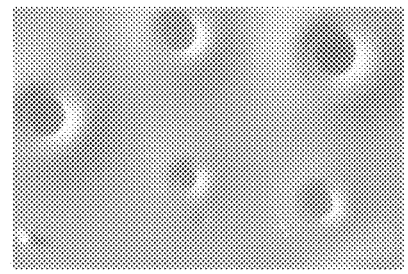
Figure 3C:
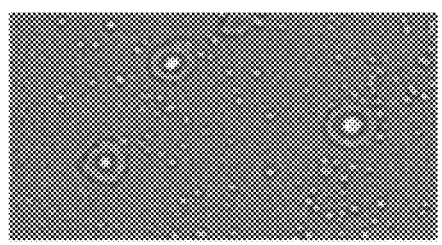
Figure 3D:
Figure 3E:
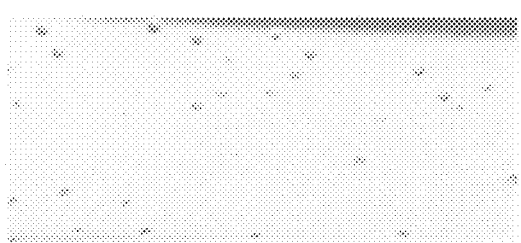
Figure 3F:
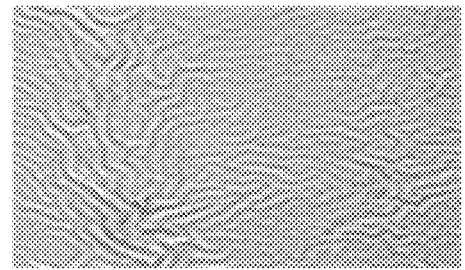

FIG. 1 is a block diagram illustrating an operating environment of a coating inspection system 100 configured to inspect coating of a surface 120 by detecting defects in the coating and inspecting thicknesses of the coating of the surface 120. The surface 120 can be components of a commercial aircraft, a rocket, a vehicle, etc. Examples of surfaces 120 with coatings applied are illustrated in FIGS. 2A and 2B. The surface 120 may have openings 200 and may have shadows 202. The shadows may due to surfaces 120 that are curved or that have protrusions. The surface 120 may be smooth, abraded, etc.

The coating inspection system 100 includes a coating inspection device 102, a camera 112, a light source 114, a camera/lighting positioner 116, and a database 118. Each of the camera 112, light source 114, camera/lighting positioner 116 and database 118 may be integrated with the coating inspection device 102 or be separate components.

The coating inspection device 102 (which may be referred to as a mobile terminal, a mobile communication terminal, a wireless communication device, a wireless terminal, a wireless communication terminal, user equipment, UE, a user equipment device, etc.) is configured to provide inspection of coatings of surfaces 120 according to embodiments of inventive concepts to detect out of tolerance thicknesses of coatings and/or defects in coatings. As shown, coating inspection device 102 has processing circuitry 104 (also referred to as a processor) coupled to memory circuitry 106 (also referred to as memory) and coupled to the interface circuitry 108 (also referred to as an interface). The memory circuitry 106 may include computer readable program code that when executed by the processing circuitry 104 causes the processing circuitry to perform operations according to embodiments disclosed herein. According to other embodiments, processing circuitry 104 may be defined to include memory so that separate memory circuitry is not required. The coating inspection device 102 also includes storage 110 that stores images provided by camera 112. Images provides by camera 112 may also be stored in database 118.

As discussed herein, operations of the coating inspection device 102 may be performed by processing circuitry 104. For example, processing circuitry 104 may control interface circuitry 108 to transmit communications such as alerts via interface circuitry 108 and/or to receive communications such as control messages through interface 108 over a radio interface or a wired interface. Moreover, modules may be stored in memory circuitry 106 and/or storage 110, and these modules may provide instructions so that when instructions of a module are executed by processing circuitry 104, processing circuitry 104 performs respective operations as described herein.

The camera 112 and light source 114 are used to acquire images of the coating on the surface 120. The coating may be a primer color coating, a sprayed on color coating, or an adhered texture color coating. The images are processed to determine whether the thickness of the coating on the surface 120 is within a specified tolerance of a required thickness of coating. Additionally, the images are processed to determine whether the coating has any defects.

The camera 112 in an embodiment is a high resolution camera, such as a 4K camera. In other embodiments, lower resolution cameras are used. The focal length of the camera 112 is not required to be a fixed focal length when the camera 112 has autofocus features.

The light source 114 should evenly comprise wavelengths across the visual color spectrum (i.e., white light). However, LED and Florescent lamps typically approximate white light, with a spike in the non-visible ultraviolet (UV) and other areas depending on the type of light. In the case of LED lights, there may be spikes in the visible violet portion. In some embodiments, the spikes are filtered from the images during processing of the images. A single light source 114 is used in some embodiments. In other embodiments, multiple light sources 114 are used.

FIGS. 2A and 2B illustrate components that may be inspected according to operations described below. FIG. 2A illustrates a surface 120 that is part of a commercial aircraft. The surface 120 may have openings 200 such as window openings, wiring openings, cooling openings for pipes, etc. The surface 120 may also have ridges that create areas of shadows 202 that need to be accounted for during coating inspections. The surface 120 may also be curved (see FIG. 2B), rough, smooth, abraded due to wear during operation of the surface 120, etc.

Turning to FIGS. 3A-3F, examples of defects that can be found during inspection include bubbling (see FIG. 3A), cratering (see FIG. 3B), fish-eyes (see FIG. 3C), pin-holing (see FIG. 3D), popping (see FIG. 3E), wrinkles (see FIG. 3F), nonadherent overspray, etc. Other types of defects may also be specified and the coating inspection device 102 can be trained to detect these defects. For example, other defects such as adhesion failure, alligatoring, bleeding, bridging, blistering, brush marks, cracking, cobwebbing, crazing, impact damage, lifting, runs, rust stains, sags, etc. can be detected when the coating inspection device is trained to detect any of these defects.

Turning to FIG. 4, an embodiment of a camera/lighting positioner 116 is illustrated. The camera/lighting positioner 116 has a robotic arm 400 that is controlled by the coating inspection device 102, by another device (not shown) or by personnel such as inspectors responsible for inspecting the coatings of the surface 120 by moving the robotic arm 400 to position the camera 112 and light source 114 at positions to capture images of the coating on surface 120 at specified locations. For example, the images may be captured in a piece-wise fashion while the robotic arm 400 is moved across the surface 120. The robotic arm 400 can be controlled locally or remotely, depending on the location where the coated surface 120 to be tested is located. The robotic arm base 402 may be stationary or may be moveable, depending on the location of the camera/lighting positioner 116. If no robotic arm 400 is available at the location of the coated surface 120 to be tested, other methods of using the camera and light source are used. For example, a camera 112 and light source 114 may be mounted to a pole and used to capture images of the coated surface 120. When no camera/lighting positioners 116 are available, an inspector may use the camera 112 to capture images of the coated surface 120 to be tested as explained below. While the light source 114 and camera 112 are shown as separate components in FIG. 4, the camera 112 and light source may be integrated into a single component.

Figure 5:
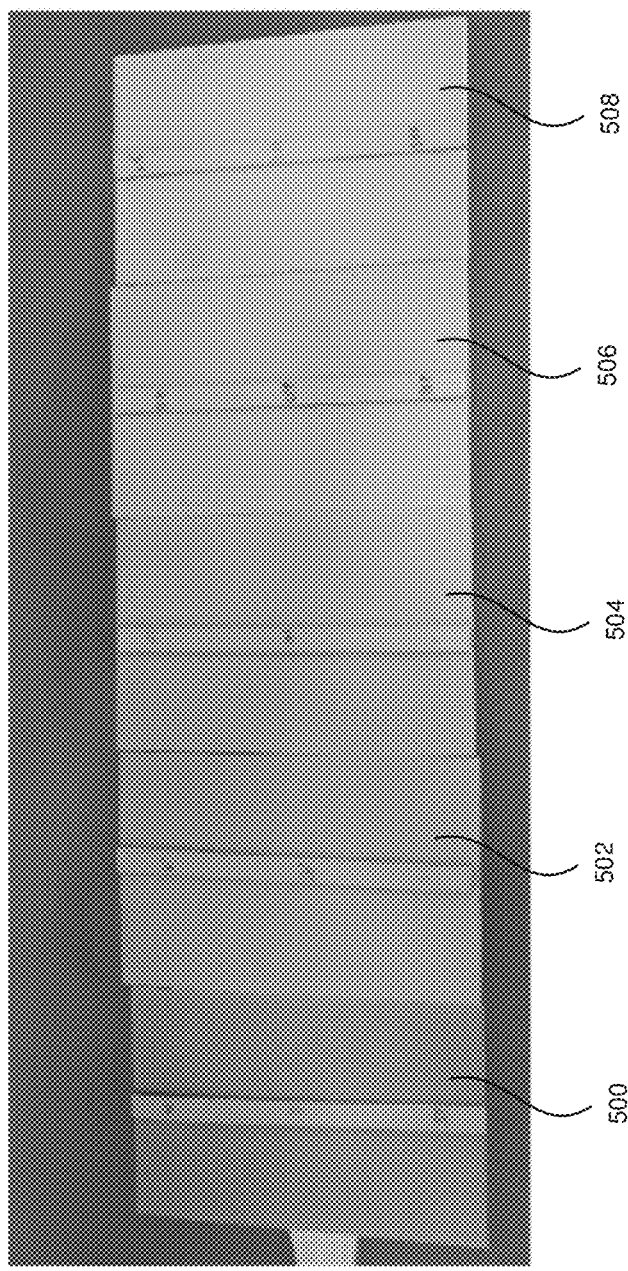
FIG. 5 is a block diagram illustrating coating thickness samples used in some embodiments of inventive concepts.

Prior to describing operations of the coating inspection device 102, an example of coating thicknesses on a surface 120 is illustrated in FIG. 5. Surface samples 500 to 508 are illustrated, which are small pieces of the surface 120 that are "painted" with a coating to known coating thicknesses. The coating thickness vary from a relatively thin thickness illustrated in surface sample 500 to a relatively thick thickness illustrated in surface sample 508. For example, surface sample 500 may be considered in some embodiments to be outside an acceptable thickness since the thickness is thin. Each thickness is associated with a color of the coating on the surface 120. One of the surface samples in an embodiment has a coating with a thickness substantially close to the required or specified thickness.

In the description that follows, images are acquired of the coating applied to surface 120. Color space values are generated from the images that were acquired using known algorithms and are used to determine thickness of the coating applied to surface 120. The surface 120 can be a composite surface or a non-composite surface. The color space values may be red-green-blue (RGB) color space values, hue-saturation-value (HSV) color space values and/or lightness/red-green/blue-yellow (LAB) color space values. The color space values from the images acquired are compared to color space values of known thicknesses of the coating applied to surface 120 to determine whether the thickness of the coating shown in the images acquired is outside of specified thicknesses.

Figure 6:
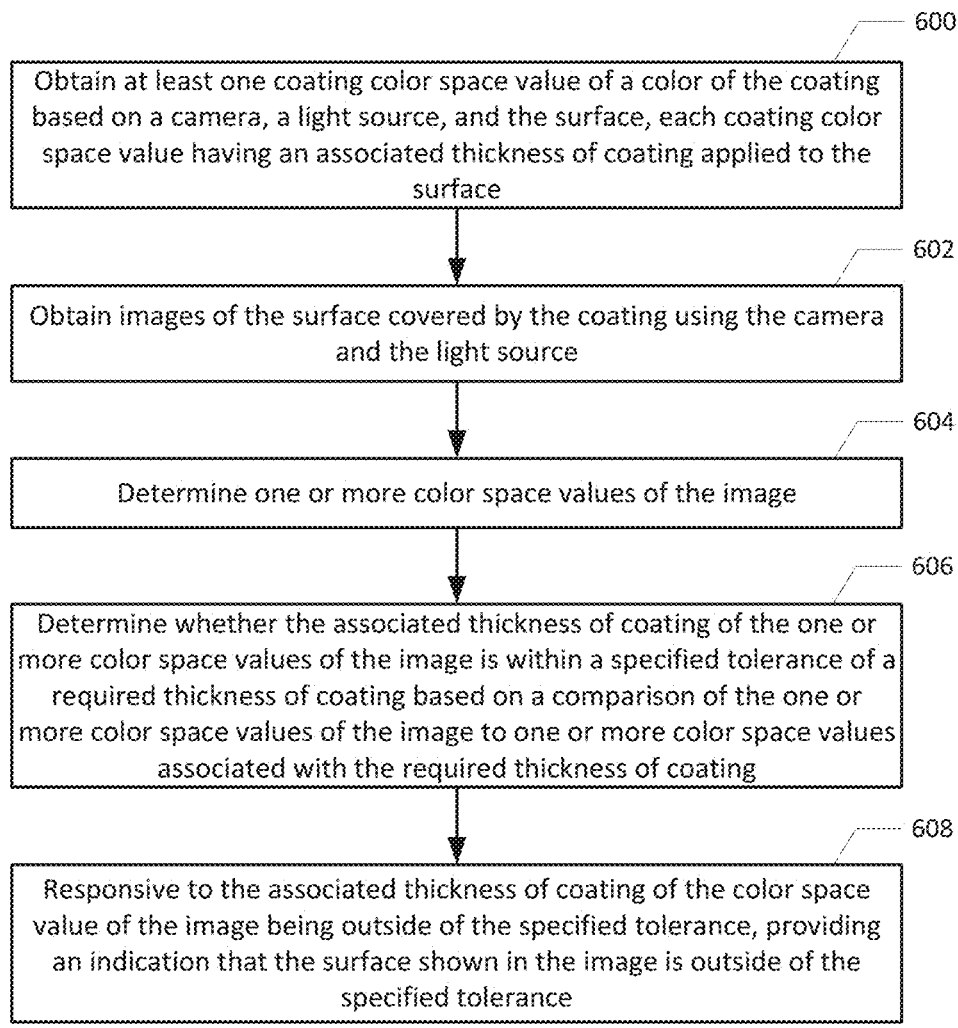
FIGS. 6-12 are flow charts illustrating operations of a coating inspection device according to some embodiments of inventive concepts.

Turning now to FIG. 6, operations of the coating inspection device 102 will now be discussed according to some embodiments of inventive concepts. For example, modules may be stored in memory 106 of FIG. 2, and these modules may provide instructions so that when the instructions of a module are executed by respective device processing circuitry 104, processing circuitry 104 performs respective operations of the flow chart of FIG. 6.

In operation 600, the processing circuitry 104 obtains coating color space values of a color of the coating based on a camera 112, a light source 114, and the surface 120, each coating color space value having an associated thickness of coating applied to the surface of the component. The coating color space values may be obtained from coating color space values stored in database 118 or storage 110.

When there are no coating color space values stored in database 118 or storage 110, the coating color space values are generated. One embodiment of generating coating color space values is illustrated in FIG. 8.

Figure 8:
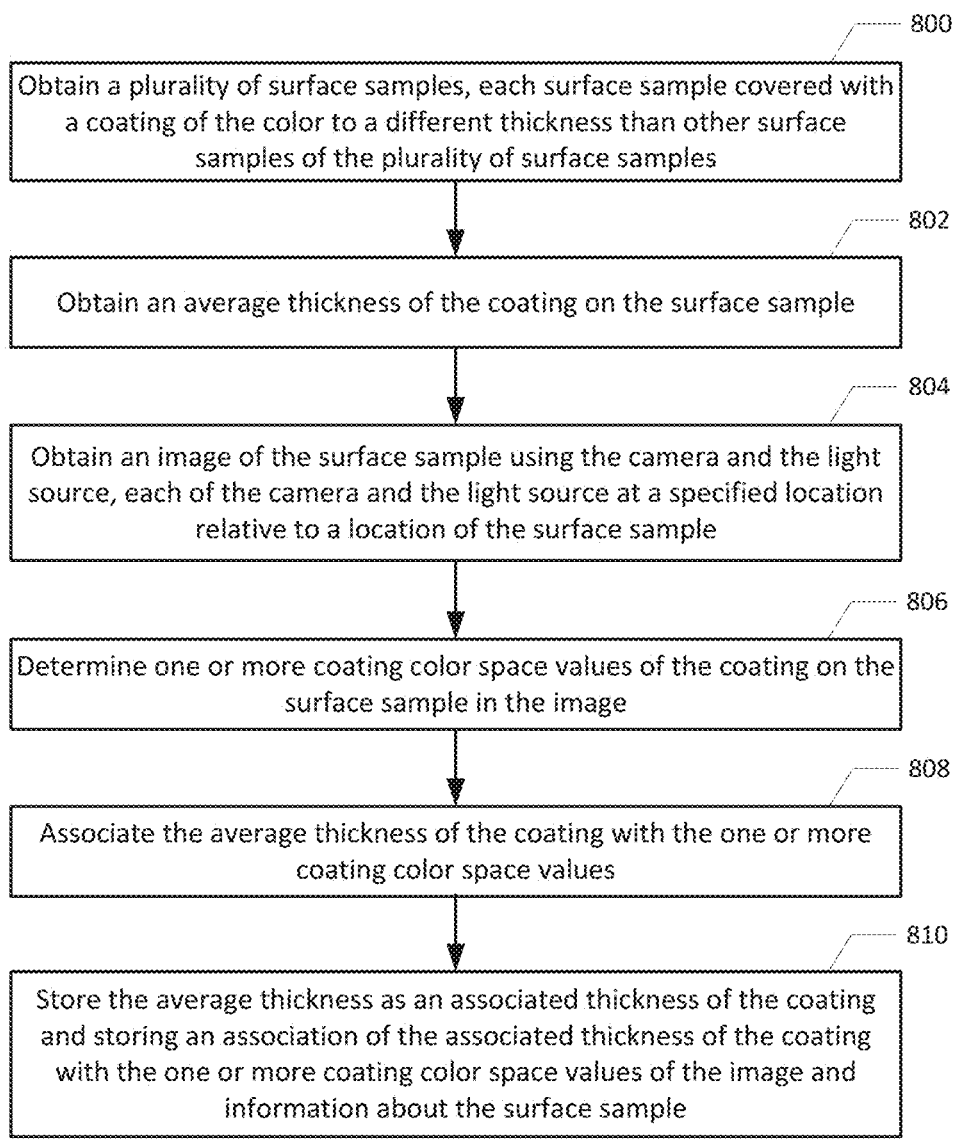

Turning to FIG. 8, the coating inspection device 102 is trained to learn the color space values. In operation 800, a plurality of surface samples are obtained, each surface sample covered with a coating of the color to a different thickness than other surface samples of the plurality of surface samples. FIG. 5 illustrates surface samples 500-508 each having a different coating thickness relative to other coating thicknesses of other surface samples. In operation 802, the average thickness of the coating on each surface sample is obtained. The average thickness can be determined by determining the thickness of the coating at various points on the sample with the average thickness obtained based on the thicknesses determined.

In operation 804, the processing circuitry 104 obtains images of each surface sample acquired by the camera 112 and the light source 114. The distance and angle of incidence to the surface of both the light source 114 and the camera 112 should be the same distance and angle for each image acquired by the camera 112. The angle of incidence should be normal to the surface. However, if the angle of incidence is not normal to the surface, the images may be processed using normalization techniques provided that the variation from normal installation is known and constant for the images taken by the camera 112. The images acquired should be from images taken at various locations.

Values of the different types of color spaces (e.g., RGB, HSV, LAB, etc.) are determined in operation 806 by the processing circuitry 104. Depending upon the surface 120 receiving the coating and the coating properties, certain color space values can be weighted higher than others. However, in most cases, more than one color space value is used to determine measurement values. Different color space analysis values can provide better prediction for different thicknesses of the coating, different colors of the coating, and different types of surfaces 120.

In operation 808, the processing circuitry 104 associates the average thickness of the coating with the coating color space values. In operation 810, the processing circuitry 104 stores the average thickness as an associated thickness of the coating and stores an association of the associated thickness of the coating with the coating color space value of the image and information about the surface sample. For example, the information about the surface sample may include the type of surface (e.g., composite or non-composite), the surface material, whether the surface is smooth or rough, etc.

It should be noted that when a sufficient number of color samples have been processed using the operations of FIG. 8, transfer learning is utilized by the processing circuitry 104. This enables adequate detection of out of tolerance thicknesses leveraging existing dissimilar color space classifications and does not require the use of the coating samples, while still providing reasonably high success.

Returning to FIG. 6, in operation 602, the processing circuitry 104 obtains images of the surface covered by the coating using the camera 112 and light source 114. In one embodiment, the processing circuitry 104 uses a geometry map (e.g., a computer-aided design (CAD) drawing) to determine which areas of the surface 120 are to be inspected using images acquired by the camera 112 via and which areas (e.g., openings) are not to be inspected (i.e., no images are acquired). For example, the processing circuitry 104 obtains a drawing of the surface 120 showing each location of an opening in the surface. Each opening (e.g., opening 200) is mapped to ensure that no images in the images obtained are of an opening based on the mapping. This results in the processing circuitry 104 only obtaining images of areas known to need inspection. In another embodiment, the processing circuitry 104 learns the areas of the surface 120 not to be inspected based on the images acquire.

The camera 112 and light source 114 are used to acquire the images. The distance and angle of incidence to the surface of both the light source 114 and the camera 112 are dependent upon the features on the part. For example a flat part or a gently curved part (which may be approximated over small sections) provide a different level of complexity than a part with multiple contours or with projected features (such as a spar on a wing panel). When appropriate based on the light source 114, a filter may be used to remove the area of noise associated with the measurement. For surfaces 120 that are large, the coating coverage of the surface 120 is inspected by acquiring "piece-wise" images of the surface 120. This allows the camera 112 and light source 114 to be positioned at the same angle to acquire images of the coated surface 120. Generally, the light source 114 angle(s) (more than one if multiple light sources) and camera 112 acquisition angle should be within +/−5 degrees of other images acquired by the camera 112.

Where possible (e.g. gentle curves of a surface such as a wing panel), piece-wise analysis of the surface using "piece-wise" images allows the surface to be approximated as a flat surface. Where this is not possible (e.g. spars or stringers on a wing panel), part geometries are used to remove areas contributing to perturbation away from the images being acquired, illumination of light sources 114 are controlled for the geometry and these areas are examined separately across angles necessary to minimize light effects.

When the camera/lighting positioner 116 is available and is a robotic arm 400 or other type of mechanically positioned arm, the camera angle of the camera 112 is controlled by the mechanically positioned arm. This is useful when, for example, the surface 120 is held in place by a fixture such as the fixtures shown in FIGS. 2A and 2B.

When the image is processed, the processing circuitry 104 can determine whether there are:
 1. Surface textures that effect the image processing,
 2. Features that help locate the image (e.g. relative to a CAD drawing),
 3. Features that are indicative of areas to be processed separately (e.g. stringers/other protrusions/recesses/contours and areas of shadow cast by stringers/protrusions/recesses/contours based on the image acquisition/illumination location), and
 4. Image area(s) to be further processed.

When the processing circuitry 104 determines that there are areas of a surface 120 that are to be processed separately, the processing circuitry 104 may initiate controlling of the position of the camera 112 and the position of the light source 114 relative to an area of the surface 120 that is to be processed separately so that the light source 114 and camera 112 are located at positions that results in no shadows from appearing on the image captured by camera 112.

In operation 604, the processing circuitry 104 determines a color space value of the image. For example, the image may be processed to determine one or more of RGB color space values, HSV color space values, and LAB color space values.

In operation 606, the processing circuitry 104 determines whether the associated thickness of coating of the one or more color space values of the image is within a specified tolerance of a required thickness of coating based on a comparison of the one or more color space values of the image to one or more color space values associated with the required thickness of coating.

Figure 7:
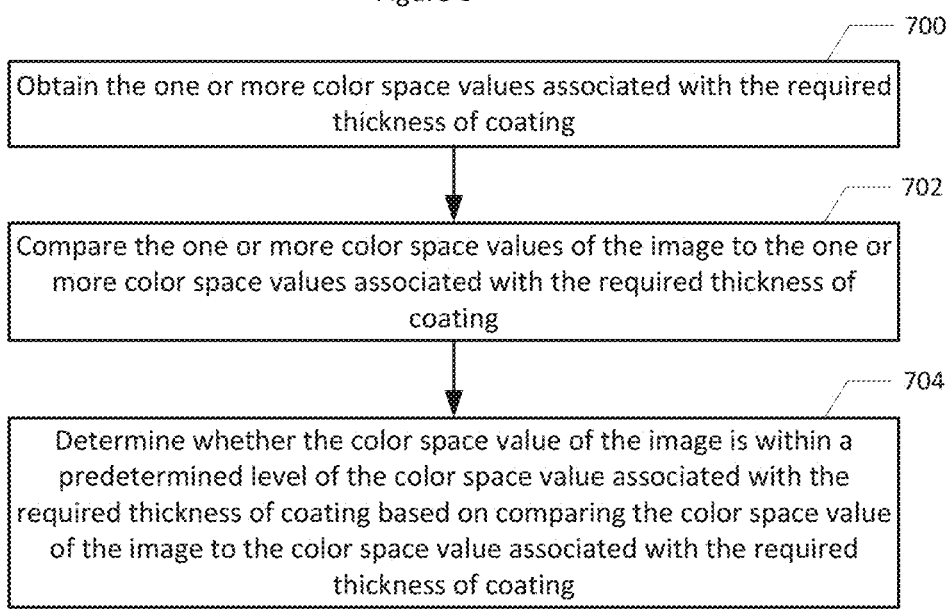

In one embodiment, the determination in operation 606 is performed using the operations in the flow chart illustrated in FIG. 7.

Turning now to FIG. 7, in operation 700, the processing circuitry 104 obtains the one or more color space values associated with the required thickness of coating. These one or more color space values may be obtained from the coating color space values of a color of the coating obtained in operation 600 of FIG. 6.

In operation 702, the processing circuitry 104 compares the one or more color space values of the image to the one or more color space values associated with the required thickness of coating. For example, the processing circuitry 104 compares the R, G, and B color space values of the image to the R, G, and B color space values associated with the required thickness of coating.

In operation 704, the processing circuitry 104 determines whether each of the one or more color space values of the image are within a predetermined level (e.g., a threshold level) of the one or more color space values associated with the required thickness of coating based on the comparing of the one or more color space values of the image to the one or more color space values associated with the required thickness of coating. When the one or more color space values of the image are within the predetermined level, the one or more color space values of the image are within the specified tolerance of the required thickness of coating.

In determining whether each of the one or more color space values of the image are within a predetermined level of the one or more color space values associated with the required thickness of coating, the processing circuitry 104 may weight some of the one or more color space values associated with the required thickness of coating higher than other color space values associated with the required thickness of coating. For example, RGB color space values may be more accurate in determining coating thickness than HSV color space values or LAB color space values depending upon the material receiving the coating and the coating properties. With other materials and/or other coatings, HSV color space values may be more accurate in determining coating thickness than RGB color space values and LAB color space values. In some other materials and/or some other coatings, LAB color space values may be more accurate in determining coating thickness than RGB color space values and HSV color space values. In these situations, the color space value that are more accurate may be weighted higher than the other color space values. The determining then uses a weighted evaluation to determine whether there are color space values of the image are within the predetermined level and, in some embodiments, determine a percentage level of confidence of the weighted evaluation.

Returning to FIG. 6, in operation 608, responsive to the associated thickness of coating of the one or more color space values of the image being outside of the specified tolerance, the processing circuitry provides, via interface circuitry 108, an indication that the coating on the surface shown in the image is outside of the specified tolerance. The indication may indicate that a rework of the coating shown in the image is required and include location information of where the surface shown in the mage is located.

The indication may include:
 (1) a display on a static image that has been processed,
 (2) a display in the field of view of a portable device (e.g. tablet, cell phone, etc.) with a camera actively pointed at the surface under examination and a screen to display the camera view and overlay of processed information, or
 (3) a display using an virtual reality (VR), augmented reality (AR), mixed reality (MR) or extended reality (XR) headset using either a static, previously acquired image set (point cloud data, plus 2D imagery for example) or actively acquired camera integrated with the VR/AR/MR/XR equipment to dynamically overlay the processed information directly in the field of view in 3D, or (4) a message sent to local and/or remote recipients indicating the coating on the surface is outside of a specified tolerance. This indication may indicate the coating is too thin, too thick, missing, etc.

The processing circuitry 104 in one embodiment determines, based on the image, whether the coating applied to the surface is free of specified defects based on comparing the image to images of specified defects, wherein the specified defects comprise at least one of bubbling, cratering, fisheyes, nonadherent overspray, pinholing, popping, and wrinkles. For example, the processing circuitry 104 may compare the image to the images of defects illustrated in FIGS. 3A-3F.

The criteria for inspection can vary depending on the part with the surface 120 and the coating applied to the surface 120. For example, two coats of primer are applied to wing panels. Inspection occurs after each coat. A tolerance is allowed for thickness after each operation. If the thickness falls inside the allowed thickness, the operation passes for the area under inspection, if not it either fails as too thick or too thin. A digital point cloud representation of the measured thickness values for discrete sections of the surface 120 or surfaces 120 of a part can be stored for later analysis (e.g. consistency, efficiency of coat thickness, etc.).

When a coating thickness of a surface 120 is outside of a specified tolerance or a defect is found on the coating of the surface 120, rework of the coating is performed. In one embodiment, as the digital point cloud map is built, failed areas are alerted while image acquisition may still be underway. The failures are specified on a digital representation of the part using color coding (shading) and numeric measurement values based on the color space analysis described above.

Image acquisition in one embodiment is independent of image analysis. In this embodiment, the processing circuitry 104 performs analysis "on the fly" and generates a surface coat thickness map (which can then be shown on a digital representation of the part geometry or, for example, loaded as point cloud data to be visualized in an immersive reality headset or as an overlay on a two dimensional display such as a tablet or smart phone).

Figure 9:
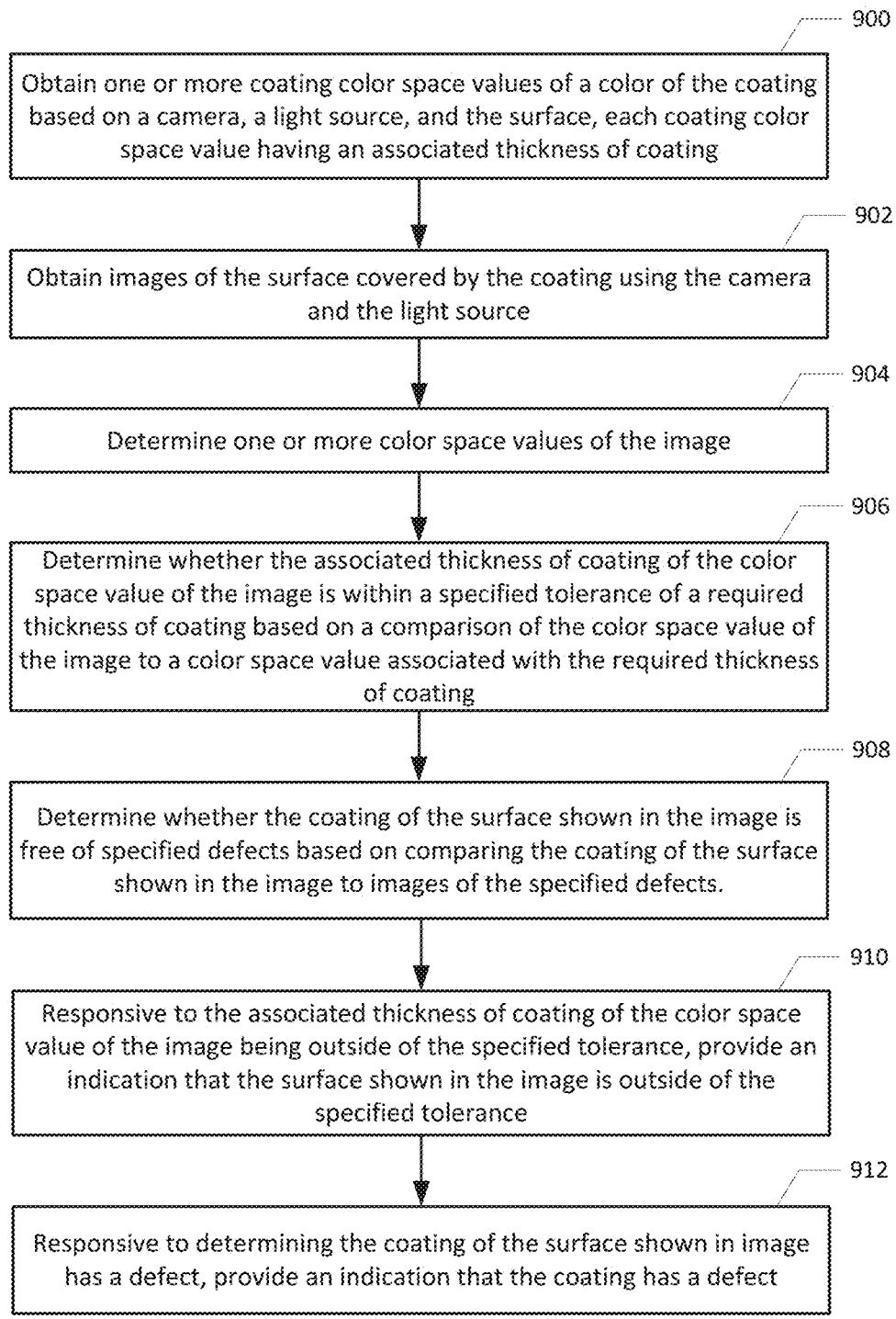

Turning now to FIG. 9, in another embodiment, the inspection for coating thickness and inspection for defects is performed. In operation 900, the processing circuitry 104 obtains coating color space values of a color of the coating based on a camera, a light source, and the surface, each coating color space value having an associated thickness of coating. The processing circuitry 104 in performing operation 900 performs the same or similar operations described above with respect to operation 600.

In operation 902, the processing circuitry 104 obtains images of the surface covered by the coating using the camera 112 and light source 114. The processing circuitry 104 in performing operation 902 performs the same or similar operations described above with respect to operation 602.

In operation 904, the processing circuitry 104 determines a color space value of the image. For example, the image may be processed to determine one or more of RGB color space values, HSV color space values, and LAB color space values. The processing circuitry 104 in performing operation 904 performs the same or similar operations described above with respect to operation 604.

In operation 906, the processing circuitry 104 determines whether the associated thickness of coating of the one or more color space values of the image is within a specified tolerance of a required thickness of coating based on a comparison of the one or more color space values of the image to one or more color space values associated with the required thickness of coating. The processing circuitry 104 in performing operation 906 performs the same or similar operations described above with respect to operation 606.

Figure 10:
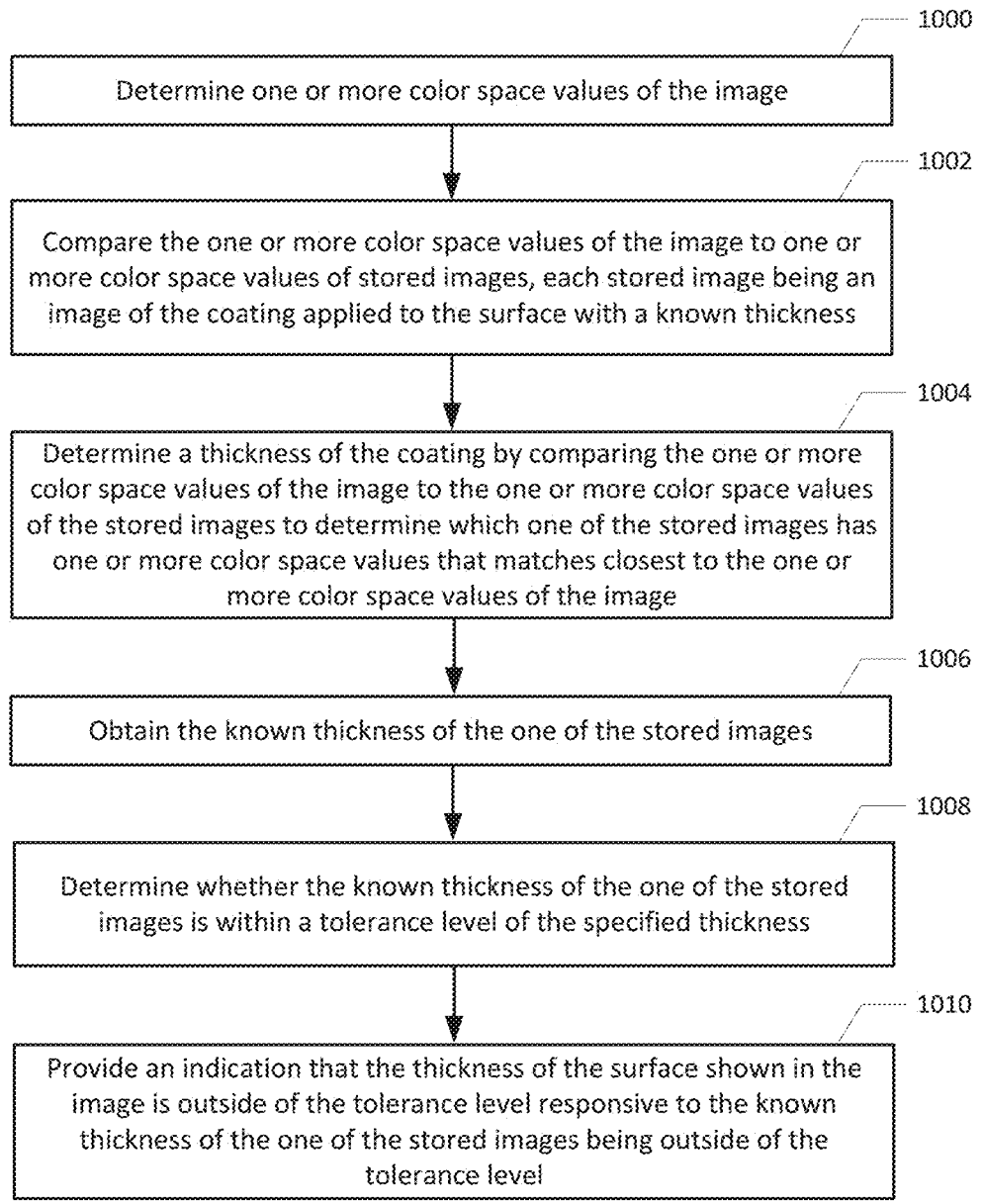

FIG. 10 illustrates one embodiment of determining whether the associated thickness of coating of the one or more color space values of each image is within a specified tolerance of a required thickness of coating. Turning to FIG. 10, in operation 1000, the processing circuitry 104 determines one or more color space values of the image as described above. In operation 1002, the processing circuitry compares the one or more color space values of the image to one or more color space values of stored images, each stored image being an image of the coating applied to the surface with a known thickness.

In operation 1004, the processing circuitry 104 determines a thickness of the coating by comparing the one or more color space values of the image to the one or more color space values of the stored images to determine which one of the stored images has one or more color space values that matches closest to the one or more color space values of the image.

In operation 1006, the processing circuitry 104 obtains the known thickness of the one of the stored images. In operation 1008, the processing circuitry determines whether the known thickness of the one of the stored images is within a tolerance level of the specified thickness, In operation 1010, the processing circuitry 104 provides an indication that the thickness of the surface shown in the image is outside of the tolerance level responsive to the known thickness of the one of the stored images being outside of the tolerance level.

Returning to FIG. 9, in operation 908, the processing circuitry 104 determines whether the coating of the surface 120 shown in the image is free of specified defects based on comparing the coating of the surface shown in the image to images of the specified defects. The specified defects are one or more of bubbling, cratering, fisheyes, nonadherent overspray, pinholing, popping, and wrinkles.

Figure 11:
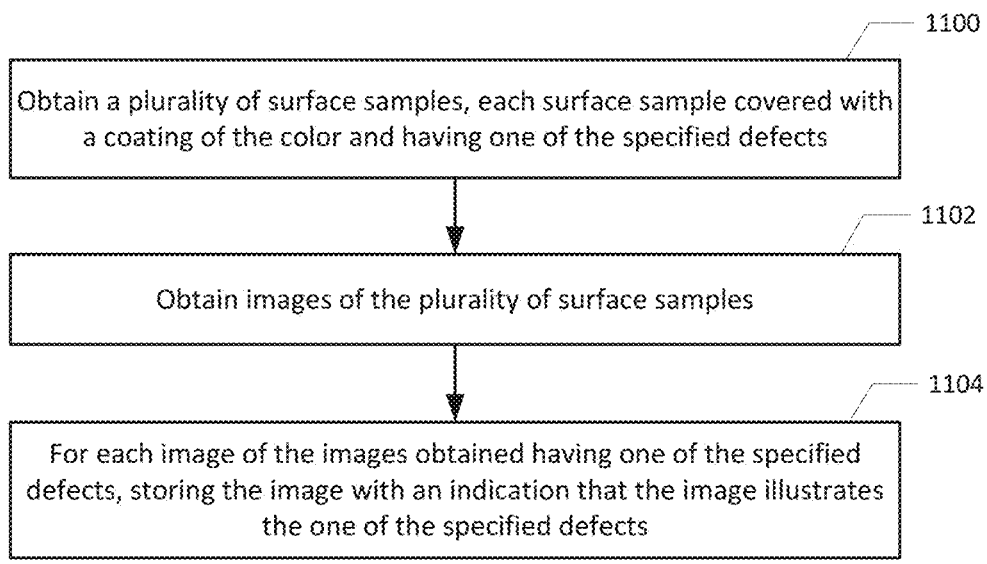

In one embodiment, the images of the specified defects are obtained from storage 110 or database 118. In another embodiment, the images are generated. Turning to FIG. 11, in operation 1100, the processing circuitry obtains a plurality of surface samples of the surface, each surface sample covered with a coating of the color and having one of the specified defects. In operation 1102, the processing circuitry, using camera 112 and light source 114, obtains images of the plurality of surface samples of the surface. The images may be obtained from one or more environments such as a painting facility, a maintenance facility, etc. In operation 1104, the processing circuitry 104 for each image of the images obtained having one of the specified defects, stores the image with an indication that the image illustrates the one of the specified defects.

Returning to FIG. 9, in operation 910, the processing circuitry 104 responsive to the associated thickness of coating of the color space value of the image being outside of the specified tolerance, provides an indication that the surface shown in the image is outside of the specified tolerance. The processing circuitry 104 in performing operation 908 performs the same or similar operations described above with respect to operation 608.

In operation 912, the processing circuitry 104 responsive to determining the coating of the surface shown in the image has a defect, provides an indication that the coating has a defect, the indication comprising at least an identification of the defect and a location of the defect. The indication may be displayed in the same way as described in operation 606, but for the specified defect instead of the thickness being outside of a specified tolerance. Additionally, the indication may be provided in the same digital point cloud or digital representation of the part as described above.

Figure 12:
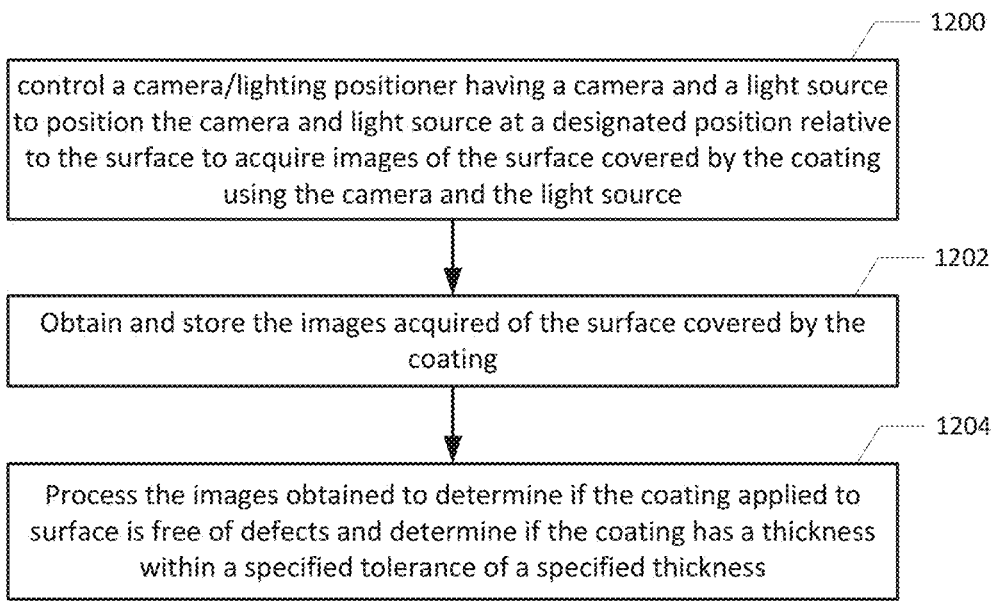

Turning now to FIG. 12, the processing circuitry 104 of the coating inspection device 102 in operation 1200 controls a camera/lighting positioner 116 having a camera 112 and a light source 114 to position the camera 112 and light source 114 at a designated position relative to the surface 120 to obtain images of the surface covered by the coating using the camera 112 and the light source 114.

In operation 1202, the processing circuitry 104 obtains and stores the images of the surface covered by the coating using the camera 112 and the light source 114.

In operation 1204, the processing circuitry 104 processes the images obtained to determine if the coating applied to the surface is free of defects and has a thickness within a specified tolerance of a specified thickness.

The processing circuitry 104 determines if the coating applied to the surface is free of defects by comparing the images obtained to stored images having defects in the coating applied to the surface as described above. The processing circuitry 104 provides an indication of a defect responsive to one of the images obtained matching one of the stored images having defects as described above.

The processing circuitry 104 determines, for each image of the images obtained, if the coating applied to the surface has a thickness within the specified tolerance of a specified thickness. In determining if the coating applied to the surface has a thickness within the specified tolerance, the processing circuitry 104 determines one or more color space values of the image and compares the one or more color space values of the image to one or more color space values of stored images, each stored image being an image of the coating applied to the surface with a known thickness. The processing circuitry 104 determines a thickness of the coating by comparing the one or more color space values of the image to the one or more color space values of the stored images to determine one of the stored images that matches closest to the one or more color space values of the image and obtains the known thickness of the one of the stored images. The processing circuitry 104 determines if the known thickness of the one of the stored images is within a tolerance level of the specified thickness and provides an indication that the thickness of the surface shown in the image is outside of the tolerance level responsive to the known thickness of the one of the stored images being outside of the tolerance level.

Other operations the coating inspection device 102 performs in some embodiments includes obtaining a plurality of images of samples of the surface with coating applied to the samples of the surface, each sample having a known thickness of the coating, the coating being of a specified color. For each image of the plurality of images, the coating inspection device 102 determines one or more color space values of the image, and stores an association of the known thickness of the coating shown in the image, the one or more color space values of the image, the specified color, and the image in the storage. The coating inspection device 102 in processing the images obtained to determine if the coating applied to the surface has a thickness within a specified tolerance of a specified thickness, obtains the association, from storage, of each image of the plurality of images and determines if one or more color space values of the images obtained are within a tolerance level of any association Yet other operations of the coating inspection device 102 in other embodiments obtains a plurality of images of samples of the surface with a coating applied to the samples of the surface with known defects in the coating, each sample having a known defect of the coating, the coating being of a specified color. For each image of the plurality of images, the coating inspection device 102 stores an association of the known defect of the coating in the image and the image in the storage. In processing the images obtained to determine if the coating applied to the surface is free of defects, the coating inspection device 102 obtains the association, from storage, of each image of the plurality of images and obtains each of the plurality of image and determines if any of the images obtained are within a tolerance level of any image of the plurality of images having a known defect. The known defects may be one or more of bubbling, cratering, fisheyes, nonadherent overspray, pinholing, popping, and wrinkles.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a non-transitory computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

We claim:

1. A method performed by a processor to inspect coverage of a coating applied to a surface of a component, the method comprising:
    obtaining at least one coating color space value of a color of the coating based on a sample surface having a same surface as the surface of the component and at least one associated thickness of the at least one coating color space value, each of the at least one coating color space value having an associated thickness of coating applied to the sample surface, wherein an associated thickness of coating of one or more of the at least one coating color space value is a required thickness of coating that is applied to the surface of the component;
    obtaining images of the surface of the component covered by the coating using a camera and a light source, wherein the surface of the component covered by the coating has the coating applied to the surface of the component; and
    processing each image of the surface of the component obtained by:
        determining one or more color space values of the image of the surface of the component;
        determining whether a thickness of coating associated with the one or more color space values of the image of the surface of the component is within a specified tolerance of the required thickness of coating based on a comparison of the one or more color space values of the image of the surface of the component to the one or more coating color space values having an associated thickness that is the required thickness of coating; and
        responsive to the thickness of coating associated with the one or more color space values of the image of the surface of the component being outside of the specified tolerance, providing an indication that the surface of the component shown in the image is outside of the specified tolerance of the required thickness of coating.

2. The method of claim 1 wherein obtaining the at least one coating color space value of the color of the coating comprises obtaining at least one coating color space value of a primer color of the coating applied to the sample surface.

3. The method of claim 1 wherein obtaining the at least one coating color space value of the color of the coating comprises obtaining at least one coating color space value of a sprayed on color coating on the sample surface or an adhered texture color coating applied to the sample surface.

4. The method of claim 1 wherein obtaining the at least one coating color space value of the color of the coating based on the the sample surface comprises obtaining the at least one coating color space value of the color of the coating based on the camera, the light source, and a composite surface.

5. The method of claim 1 wherein obtaining the at least one coating color space value of a color of the coating based on the sample surface comprises obtaining the at least one coating color space value of the color of the coating based on the camera, the light source, and a non-composite surface.

6. The method of claim 1 wherein determining the one or more color space values of the image comprises determining at least one of a red/green/blue (RGB) color space value of the image, a hue/saturation/value (HSV) color space value of the image, and a lightness/red-green/blue-yellow (LAB) color space value of the image.

7. The method of claim 1 wherein determining whether the thickness associated with the one or more color space values of the image of the surface of the component is within the specified tolerance of the required thickness of coating comprises:
   obtaining the one or more color space values having an associated thickness that is the required thickness of coating;
   comparing the one or more color space values of the image of the surface of the component to the one or more color space values having an associated thickness that is the required thickness of coating; and
   determining whether each of the one or more color space values of the image of the surface of the component are within a predetermined level of the one or more color space values having an associated thickness that is the required thickness of coating based on comparing the one or more color space values of the image of the surface of the component to the one or more color space values having an associated thickness that is the required thickness of coating.

8. The method of claim 1 wherein the indication comprises an indication that rework of the coating of the surface of the component shown in the image of the surface of the component is required and location information of where the surface of the component shown in the image of the surface of the component is located.

9. The method of claim 1 wherein the indication comprises at least one of: a display of the indication on a static image that has been processed, a display of the indication in a field of view of a device with the camera pointed at the surface under examination and a screen to display a camera view and overlay of processed information, a display of the indication using a virtual reality (VR), augmented reality (AR), mixed reality (MR) or extended reality (XR) equipment using one of a static, previously acquired image set or an actively acquired camera integrated with the VR, AR, MR, or XR equipment to dynamically overly processed information including the indication directly in a field of view in 3D; or a message sent to local and/or remote recipients indicating the coating on the surface is outside of a specified tolerance.

10. The method of claim 1 wherein obtaining the at least one coating color space values of the color based on the sample surface comprises:
    obtaining a plurality of surface samples, each surface sample covered with a coating of the color to a different thickness than other surface samples of the plurality of surface samples;
    for each surface sample of the plurality of the surface samples:
       obtaining an average thickness of the coating on the surface sample;
       obtaining an image of the surface sample using the camera and the light source, each of the camera and the light source at a specified location relative to a location of the surface sample;
       determining one or more coating color space values of the coating on the surface sample in the image of the surface sample;
       associating the average thickness of the coating with the one or more coating color space values; and
       storing the average thickness as an associated thickness of the coating and storing an association of the associated thickness of the coating with the one or more coating color space values of the image of the surface sample and information about the surface of the surface sample, the information about the surface of the surface sample comprising information on a type of surface,
    wherein obtaining the one or more coating color space values of the color based on tthe sample surface comprises obtaining, from storage, the one or more coating color space values and the associations stored of the associated thickness of the coating with the one or more coating color space values of the image of the surface sample and the information about the surface of the surface sample.

11. The method of claim 1 further comprising:
for each image of the surface of the component obtained:
    determining, based on the image, whether the coating applied to the surface is free of specified defects based on comparing the image to images of the specified defects, wherein the specified defects comprise at least one of bubbling, cratering, fisheyes, nonadherent overspray, pinholing, popping, and wrinkles.

12. The method of claim 1 further comprising:
obtaining a drawing of the surface showing each location of an opening in the surface;
mapping each location of an opening; and
ensuring that no images in the images obtained are of an opening based on the mapping.

13. A method performed by a processor to inspect coverage of a coating applied to a surface of a component, the method comprising:
    obtaining one or more coating color space values of a color of the coating based on a sample surface having a same surface as the surface of the component and at least one associated thickness of coating of the one or more coating color space values, each of the one or more coating color space values having an associated thickness of coating applied to the sample surface, wherein an associated thickness of coating of one or more coating color space values is a required thickness of coating applied to the surface of the component;
    obtaining images of the surface of the component covered by the coating using a camera and a light source, wherein the surface of the component covered by the coating has the coating applied to the surface of the component;
    for each image obtained of the surface of the component covered by the coating determining one or more color space values of the image;
        determining whether a thickness of coating associated with the one or more color space values of the image is within a specified tolerance of the required thickness of coating based on a comparison of the one or more color space values of the image to the one or more coating color space value having an associated thickness that is the required thickness of coating;
        determining whether the coating of the surface shown in the image is free of specified defects based on comparing the image to images of the specified defects;

responsive to the associated thickness of coating of the one or more color space values of the image being outside of the specified tolerance of the required thickness of coating, providing an indication that the surface of the component shown in the image is outside of the specified tolerance of the required thickness of coating; and responsive to determining the coating of the surface shown in the image has a defect, providing an indication that the coating has a defect, the indication comprising at least an identification of the defect and a location of the defect.

14. The method of claim 13, wherein the specified defects comprise one or more of bubbling, cratering, fisheyes, nonadherent overspray, pinholing, popping, and wrinkles, the method further comprising:

obtaining a plurality of surface samples of the surface, each surface sample covered with a coating of the color and having one of the specified defects;

obtaining images of the plurality of surface samples of the surface; and for each image of the images obtained having one of the specified defects, storing the image with an indication that the image illustrates the one of the specified defects.

15. The method of claim 14, wherein determining whether the coating of the surface shown in the image is free of specified defects comprises:

comparing the image to images each having one of the specified defects; and responsive to the image matching within a threshold level of one of the images having one of the specified defects, indicating the coating of the surface has the one of the specified defects.

16. A coating inspection device configured to inspect coverage of a coating applied to a surface of a component, the coating inspection device comprising:

processing circuitry; and memory coupled with the processing circuitry, wherein the memory includes instructions that when executed by the processing circuitry causes the coating inspection device to perform operations comprising:

controlling a camera/lighting positioner having a camera and a light source to position the camera and light source at a designated position relative to the surface to obtain images of the surface covered by the coating using the camera and the light source;

obtaining and storing the images of the surface covered by the coating using the camera and the light source; and processing the images obtained of the surface covered by the coating to determine if the coating applied to the surface is free of defects and has a thickness within a specified tolerance of a specified thickness.

17. The coating inspection device of claim 16, further comprising:

storage coupled to the processing circuitry and the memory, wherein the memory includes further instructions that when executed by the processing circuitry causes the coating inspection device to perform further operations comprising:

determining if the coating applied to the surface is free of defects by comparing the images of the surface covered by the coating obtained to stored images of defects in the coating applied to the surface; and providing an indication of a defect responsive to one of the images obtained of the surface covered by the coating matching one of the stored images of defects.

18. The coating inspection device of claim 16, further comprising:

storage coupled to the processing circuitry and the memory, wherein the coating inspection device determines if the coating applied to the surface has a thickness within the specified tolerance of a specified thickness by:

for each image of the images obtained of the surface covered by the coating:

determining one or more color space values of the image;

comparing the one or more color space values of the image to one or more color space values of stored images, each stored image being an image of the coating applied to the surface with a known thickness; and determining a thickness of the coating by comparing the one or more color space values of the image to the one or more color space values of the stored images to determine which one of the stored images has one or more color space values that matches closest to the one or more color space values of the image;

obtaining the known thickness of the one of the stored images;

determining whether the known thickness of the one of the stored images is within a tolerance level of the specified thickness; and providing an indication that the thickness of the surface shown in the image is outside of the tolerance level of the specified thickness responsive to the known thickness of the one of the stored images being outside of the tolerance level of the specified thickness.

19. The coating inspection device of claim 16, further comprising storage coupled to the processing circuitry and the memory, wherein the coating inspection device performs further operations comprising:

obtaining a plurality of images of samples of the surface with coating applied to the samples of the surface, each sample having a known thickness of the coating, the coating being of a specified color;

for each image of the plurality of images:

determining one or more color space values of the image;

storing an association of the known thickness of the coating shown in the image, the one or more color space values of the image, the specified color, and the image in the storage; and wherein processing the images obtained to determine if the coating applied to the surface has a thickness within a specified tolerance of a specified thickness comprises:

obtaining the association, from the storage, of each image of the plurality of images;

determining the one or more color space values of an association of an image of the plurality of images that matches closest to the one or more color space values of the images obtained;

determining the known thickness of the association of the image of the plurality of images that matches closest to the one or more color space values of the images obtained; and determining whether the known thickness is outside the specified tolerance of the specified thickness.

20. The coating inspection device of claim 16, further comprising storage coupled to the processing circuitry and the memory, wherein the coating inspection device performs further operations comprising:
   obtaining a plurality of images of samples of the surface with a coating applied to the samples of the surface with known defects in the coating, each sample having a known defect in the coating, the known defect comprising at least one of bubbling, cratering, fisheyes, nonadherent overspray, pinholing, popping, and wrinkles, the coating being of a specified color;
   for each image of the plurality of images:
     determining one or more color space values of the image;
     storing an association of the known defect of the coating in the image, the specified color, the one or more color space values of the image, and the image in the storage; and
wherein processing the images obtained to determine if the coating applied to the surface is free of defects comprises:
   obtaining the association, from the storage, of each image of the plurality of images and obtaining each of the plurality of images; and
   determining if any of the images obtained are within a tolerance level of any image of the plurality of images having a known defect.

* * * * *